US005914291A

United States Patent [19]

Marsden et al.

[11] Patent Number: 5,914,291

[45] Date of Patent: Jun. 22, 1999

[54] POROUS INORGANIC CATALYST SUPPORT

[76] Inventors: Christine E Marsden, 16 Milborne Close, Chester, CH2 1HH, United Kingdom; John M Regan, 7 Ward Close, Westbrook, Warrington, Cheshire, WA5 5XY, United Kingdom

[21] Appl. No.: 08/847,260

[22] Filed: May 1, 1997

[30] Foreign Application Priority Data

| | | | |
|---|---|---|---|
| May 1, 1996 | [GB] | United Kingdom | 9609150 |
| Jun. 26, 1996 | [GB] | United Kingdom | 9613383 |

[51] Int. Cl.[6] ..... B01J 21/08

[52] U.S. Cl. ..... 502/242; 502/236

[58] Field of Search ..... 502/236, 242, 502/256

[56] References Cited

U.S. PATENT DOCUMENTS

| | | | |
|---|---|---|---|
| 4,547,557 | 10/1985 | McDaniel | 526/106 |
| 4,981,831 | 1/1991 | Knudsen et al. | 502/236 |
| 5,576,262 | 11/1996 | Denton | 502/233 |

FOREIGN PATENT DOCUMENTS

| | | | |
|---|---|---|---|
| 0 085 857 A2 | 8/1983 | European Pat. Off. | C08F 4/22 |
| 0 137 258 | 4/1985 | European Pat. Off. | C01B 33/14 |
| 0 454 239 A2 | 10/1991 | European Pat. Off. | C01B 33/16 |
| 0 492 697 A1 | 7/1992 | European Pat. Off. | B01J 21/08 |
| 0 661 299 A2 | 7/1995 | European Pat. Off. | C08F 4/22 |
| 1 415 649 | 11/1975 | United Kingdom | B01J 25/26 |
| WO 93/23438 | 11/1993 | WIPO | C08F 4/02 |

*Primary Examiner*—Michael Lewis
*Assistant Examiner*—Alexander G. Ghyka
*Attorney, Agent, or Firm*—Pillsbury Madison & Sutro, LLP

[57] ABSTRACT

Olefin polymerisation catalyst on a porous inorganic support comprising (i) 99.5 to 83.3 parts by weight of $SiO_2$, (ii) 0.5 to 10 parts by weight of Titanium and 0.85 to 1.15 parts by weight of chromium, this catalyst having a pore volume of 0.9 to 1.15 cc/g, a surface area of 440 to 540 $m^2/g$ and a mean pore diameter of between 70 and 100 Angstroms.

8 Claims, No Drawings

POROUS INORGANIC CATALYST SUPPORT

FIELD OF THE INVENTION

The present invention relates to a porous inorganic catalyst support, to a catalyst, to a process for manufacturing a porous catalyst support and to a polymerisation process using said catalyst.

BACKGROUND OF THE INVENTION

Supported chromium catalysts have long been used in olefin polymerisation.

In such products key parameters are pore volume, surface area and pore diameter. Whilst surface area and pore volume can to some extent be varied independently of one other, the pore diameter of the resulting support or catalyst is directly related to the surface area and pore volume. In particular, assuming cylindrical pores the average pore size (APD) in Angstroms is calculated as 40,000 PV($cm^3$/g)/SA($m^2$/g). Thus all three parameters influence catalyst performance and particularly the structure of the polyethylene produced. In general terms higher surface areas, pore volumes and pore diameters result in increased activity, whereas the molecular weight of the resultant polymer decreases with increase in average pore diameter. Clearly, because APD is related to surface area and pore volume as indicated above, changes in molecular weight are also effected by changes in surface area and pore volume.

U.S. Pat. No. 4,981,831 discloses a process for manufacturing a catalyst wherein a support is first formed by forming a silica titania cogel which is then first aged at neutral pH and then aged an alkaline pH. The twice aged cogel is then spray dried to form a xerogel and is then impregnated with chromium. This process requires two aging steps which altogether are typically between 13 and 23 hours long. The obtained catalyst has a low surface area (300 to 400 $m^2$/g), a pore volume of between 0.7 and 1.1 cc/g and a mean pore diameter of between 60 and 120 Angstroms.

There is therefore a need for a process which avoids a two step aging while producing a catalyst with the required mean pore diameter and a satisfactory activity.

It has now been discovered that it is possible to avoid a two-step aging process as well as a spray drying step while nevertheless obtaining a product, with an increased surface area and keeping a pore volume above 0.9 cc/g and maintaining an average pore size diameter of about 70 to 100 Angstroms, which exhibits satisfactory activity.

Tests and Definitions i) Surface Area

Surface area is determined using standard nitrogen adsorption methods of Brunauer, Emmett and Teller (BET).

ii) Pore Volume

The pore volume is determined by liquid titration. A known weight of a previously head sample is titrated with small amounts of Isopropyl Alcohol. (Reference to method—Innes WB Anal., Chem. Vol 23 (1956) 759).

iii) Mean Pore Diameter

Mean pore diameter is calculated from Surface Area and Pore Volume measurements according to $$\text{Mean Pore Diameter (Angrstroms)}=40{,}000\ \text{PV}(cm^3/g)\quad \text{SA}\ (m^2/g)$$

iv) Activity expressed as gPE/gcatalyst/hr

MI measured according to ASTM D1238, Condition 190/2.16

HLMI measured according to ASTM D1238, Condition 190/21.6

MIR is the HLMI/MI ratio.

General Description of the Invention

It is a first object of the present invention to provide a porous inorganic catalyst support comprising, on dry basis, 99.2 to 83.3% by weight of $SiO_2$, preferably 99.2 to 93.3%

0.5 to 10% by weight of Titanium, preferably 0.5 to 5%, most preferably 0.5 to 4%.

and having a pore volume of 0.9 to 1.15 cc/g, a surface area of 440 to 540 $m^2$/g and a mean pore diameter of between 70 and 100 Angstroms, preferably between 75 and 100 Angstroms.

Even more preferably the porous inorganic catalyst support comprises, on dry basis, 96.0 to 95.3% by weight of $SiO_2$ 2.4 to 2.8% by weight of Titanium and has a pore volume of 1.0 to 1.12 cc/g, a surface area of 440 to 540 $m^2$/g and a mean pore diameter of between 80 and 100 Angstroms.

Preferably also, the porous inorganic catalyst support has an average particle size of 50 to 110 $\mu$m, most preferably between 60 and 100 $\mu$m.

It is a second object of the present invention to provide a catalyst on a porous inorganic support as hereabove described further comprising, on dry basis, 0.85 to 1.15% w/w of chromium, preferably 0.9 to 1.1% w/w of chromium.

Therefore, the catalyst of the invention comprises, 99.2 to 83.3 parts by weight of $SiO_2$, preferably 99.2 to 93.3 pbw, most preferably 96.0 to 95.3 pbw, 0.5 to 10 parts by weight of Titanium, preferably 0.5 to 5 pbw, more preferably 0.5 to 4 pbw, even more preferably 2.4 to 2.8 pbw.

0.85 to 1.15 parts by weight of chromium, preferably 0.9 to 1.1 pbw, this catalyst having a pore volume of 0.9 to 1.15 cc/g, preferably 1.0 to 1.12 cc/g, a surface area of 440 to 540 $m^2$/g and a mean pore diameter of between 70 and 100 Angstroms, preferably between 75 and 100 Angstroms, more preferably between 80 and 100 Angstroms.

It is a third object of the present invention to provide a process for manufacturing a porous catalyst support comprising the steps of:

a) preparing a silica titania hydro-cogel b) washing said hydro-cogel until a sodium content of less than 0.1% by weight of solids is reached c) aging said hydro-cogel at a pH within the range of 7.4 to 7.8 for a period of 16 to 8 hours d) flash drying the obtained aged hydro-cogel.

Typically, the aged hydro-cogel has, before drying, a solid content of 15–18% by weight.

By flash drying it is meant short residence time pneumatic drying including spray drying.

Preferably the flash-dried hydro-cogel is milled and screened to get an average particle size of 50 to 110 $\mu$m, preferably between 60 to 100 $\mu$m.

The catalyst of the invention is particularly useful in olefin polymerisation.

It is therefore a fourth object of the present invention to provide a process for olefin polymerisation wherein the polymerisation is performed using a catalyst comprising, 99.2 to 83.3 parts by weight of $SiO_2$, preferably 99.2 to 93.3 pbw, most preferably 96.0 to 95.3 pbw, 0.5 to 10 parts by weight of Titanium, preferably 0.5 to 5 pbw, more preferably 0.5 to 4 pbw, even more preferably 2.4 to 2.8 pbw.

0.85 to 1.15 parts by weight of chromium, preferably 0.9 to 1.1 pbw, this catalyst having a pore volume of 0.9 to 1.15 cc/g, preferably 1.0 to 1.12 cc/g, a surface area of 440 to 540 $m^2/g$ and a mean pore diameter of between 70 and 100 Angstroms, preferably between 75 and 100 Angstroms, more preferably between 80 and 100 Angstroms.

General Description of the Invention

The present invention will be further described in the following examples.

EXAMPLE 1

Preparation of Hydro-cogel

A sulphuric acid solution containing 1.18% by weight of Titanium is prepared by mixing 36 parts by weight of 50% sulphuric acid with 50 parts by weight a titanium sulphate solution (4.53% Ti) and diluting with 107 parts by weight of water. This is mixed with a solution of sodium silicate prepared by diluting 4 parts by weight of Crystal 79, a commercially available sodium silicate solution, with 3 parts by weight of water. Solutions are used at ambient temperature. They are mixed continuously using a high shear mixer to obtain a hydrosol having a pH of 5 and a temperature of 32° C. The gelation time is about 2 minutes and the resultant silica gel has a $SiO_2$ content of 12% w/w and a Ti content of 0.32% w/w.

Washing and Aging the Hydro-cogel

The hydro-cogel is washed, using a series of exchanges with Ammonium nitrate solutions, until a sodium content of less than 0.1% by weight of solids is obtained. Washing is performed at ambient temperature. The pH is then increased to pH 7.8 by the addition of ammonium hydroxide. The hydro-cogel is hydrothermally aged at pH 7.8 and a temperature of 80° C. for 8 hours.

At this stage the hydro-cogel is about 15% w/w $SiO_2$ and has a Ti content of about 0.4% w/w.

Drying

Water is removed directly from hydro-cogel by flash drying. The resulting xerogel has a Total Volatiles content measured at 500° C. of 13.3% and a Pore Volume of 1.08 cc/g.

Milling and Screening

The resulting granular xerogel is milled and screened at 38 and 150 microns to generate product with average particle size of 100 microns.

Chromium Impregnation

Impregnation is performed using an aqueous solution of Cr (Acetate)3 to achieve 1% Cr on silica titania hydro-cogel. The obtained material is again submitted to a rapid drying to remove water.

Product

The obtained catalyst has the following characteristics:

| | |
|---|---|
| $SiO_2$ | 95.6% w/w |
| Ti | 2.64% w/w (4.4% TiO2) |
| Cr | 1.04% w/w |
| SA | 514 $m^2/g$ |
| PV | 1.05 cc/g |
| Average particle Size | 99 μm |
| Average pore diameter | 82 Angstroms |
| Soda | 173 ppm |

The obtained catalyst exhibits the following Performance Data.

The catalyst is activated in a fluidised bed reactor. Fluidising gas used is predried air and a final hold temperature of 700° C. is maintained for 5 hours prior to cooling and switching from dry air to dry nitrogen.

This activated catalyst is tested in ethylene polymerisation using a slurry reactor operating at 103° C. and 600 psi. Polymerisation is continued to a productivity of approximately 2000 g/g. Values obtained for induction time (mins), catalyst activity (g/g/hr) and MI and HLMI values of resulting polymer are tabulated below. MI and HLMI values quoted are corrected to productivity of 2000 g/g.

| | Test 1 | Test 2 |
|---|---|---|
| Induction time | 4 | 4 |
| Catalyst Charge | 0.103 g | 0.136 g |
| Activity | 1898 | 1978 |
| MI | 0.04 | 0.04 |
| HLMI | 6.1 | 5.0 |
| MIR | 152 | 126 |

EXAMPLE 2

A xerogel as produced in example 1 was milled and screened and then impregnated with chromium to get a product having a surface area of 498 $m^2/g$, a pore volume of 1.05 cc/g, an average pore diameter of 84 Angstroms and an average particle size of 66 micrometers.

The catalyst was then tested as in Example 1 at a catalyst charge of 0.132 g. The performances are summarized as follows:

| | Test 3 |
|---|---|
| Catalyst Charge (g) | 0.132 |
| Induction Time (min) | 1 |
| Activity (g/g/hr) | 2660 |
| MI | 0.03 |
| HLMI | 6.5 |
| MIR | 217 |

EXAMPLE 3

A sulphuric acid solution containing 2.26% Ti by weight of Titanium is prepared by mixing 39 parts by weight of a 77% sulphuric acid solution with 10 parts by weight of a titanium sulphate solution (4.8% Ti) and diluting with 38 parts by weight of water. This is mixed with a solution of sodium silicate prepared by diluting 4 parts by weight of Crystal 79, a commercially available sodium silicate solution, with 3 parts by weight of water. Solutions are mixed continuously using a high shear mixer to obtain a hydrosol having a pH of 5 and a temperature of 31° C.

The hydrocogel is washed and aged as described in Example 1. The resulting hydrogel is about 15% w/w $SiO_2$ and has a Ti content of 0.78% w/w.

Water is removed directly from the hydrocogel by flash drying. The resulting xerogel has a Total Volatiles content measured at 500° C. of 8.5%, a Pore Volume of 0.95 cc/g, a Surface Area of 524 $m^2/g$ and a Titanium content of 5.06%.

The resulting granular xerogel is milled and screened as in Example 1.

Chromium impregnation is performed using an aqueous solution of $Cr(Acetate)_3$ to achieve 1% w/w Cr.

The resulting catalyst is activated in a fluidised bed reactor and tested in ethylene polymerisation using a slurry reactor as described in Example 1. The following performance characteristics were recorded.

| | Test 4 | Test 5 |
|---|---|---|
| Catalyst Charge (g) | 0.162 | 0.139 |
| Induction Time (min) | 0 | 5 |
| Activity (g/g/hr) | 2444 | 2283 |
| MI | 0.03 | 0.04 |
| HLMI | 5.6 | 5.3 |
| MIR | 187 | 133 |

We claim:

1. Porous inorganic catalyst support comprising, on a dry basis, 99.2 to 83.3% by weight of $SiO_2$, 0.5 to 10% by weight of titanium, and having a pore volume of 0.9 to 1.15 cc/g, a surface area of 440 to 540 $m^2/g$ and a mean pore diameter of between 70 and 100 Angstroms.

2. Porous inorganic catalyst support according to claim 1 comprising, on a dry basis, 96.6 to 95.3% by weight of $SiO_2$ 2.4 to 2.8% by weight of titanium and having a pore volume of 1.0 to 1.12 cc/g, a surface area of 440 to 540 $m^2/g$ and a mean pore diameter of between 80 and 100 Angstroms.

3. Porous inorganic catalyst support according to claim 1 having an average particle size of 50 to 110 $\mu$m.

4. Catalyst on a porous inorganic support comprising 99.2 to 83.3 parts by weight of $SiO_2$, 0.5 to 10 parts by weight of titanium, 0.85 to 1.15 parts by weight of chromium, said catalyst having a pore volume of 0.9 to 1.15 cc/g, a surface area of 440 to 540 $m^2/g$ and a mean pore diameter of between 70 and 100 Angstroms.

5. Process for manufacturing a porous catalyst support according to claim 1 comprising the steps of a) preparing a silica titania hydro-cogel b) washing said hydro-cogel until a sodium content of less than 0.1% by weight of solids is reached c) aging said hydro-cogel at a pH within the range of 7.4 to 7.8 for a period of 16 to 8 hours and d) flash drying the obtained aged hydro-cogel.

6. Process according to claim 5 wherein the flash-dried cogel is milled and screened to obtain an average particle size 50 to 110 $\mu$m.

7. The support according to claim 1 comprising, on a dry basis, 99.2 to 93.3% by weight of $SiO_2$ and 0.5 to 4% by weight of titanium, said support having an average particle size of between 60 and 100 $\mu$m.

8. The catalyst on a support according to claim 1 comprising 96.0 to 95.3 parts by weight of $SiO_2$, 2.4 to 2.8 parts by weight of titanium and 0.9 to 1.1 parts by weight of chromium, said catalyst having a pore volume of 1.0 to 1.12 cc/g and a mean pore diameter of between 80 an 100 Angstroms.

* * * * *